2,905,524
METHOD OF SEPARATING URANIUM AND THORIUM FROM EACH OTHER

René Mahut, Gentilly, Joseph Muller, Ballancourt, and Jean Sauteron, Paris, France, assignors to Commissariat a l'Energie Atomique, Paris, France No Drawing. Application January 24, 1957
Serial No. 635,966

Claims priority, application France January 25, 1956

7 Claims. (Cl. 23—14.5)

The present invention relates to methods of separating from each other uranium and thorium present in raw materials containing a relatively high amount of these elements, and for instance from high grade ores (uranothorianite) or concentrated materials obtained by treatment of low grade ores.

It should be reminded that it is known to form a solution of such a raw material by attacking it by means of an acid (such as nitric or sulfuric acid), then to separate from each other the uranium and thorium present in this solution by precipitating their little soluble compounds by suitable reactions in an acid or basic medium.

If this separation is effected in an acid medium, the following methods are known.

Solutions of thorium and uranium nitrates containing one hundredth of a gram-molecule per liter may be precipitated, at a pH of 3 for thorium and 3.8 for uranium, to give hydroxides of gelatinous consistency. Separation is possible but it calls for a great number of stages of purification and relatively difficult filtrations.

In the presence of sulfuric acid (from 30 to 40% of $SO_4H_2$), hydrated thorium sulfate has a solubility which is only from 10 to 12 grams per liter at 30° C., but this sulfate swells when becoming hydrated, which makes it difficult to filtrate, and it cannot be washed because of its solubility.

It is also possible to use hydrofluoric acid since thorium fluoride is known to be insoluble in an acid medium, but precipitation is delicate due to the existence of double fluorides which increase solubility and the precipitate has a tendency to form a solid mass, which makes it difficult to wash. Furthermore, hydrofluoric acid is an expensive product and is particularly corrosive.

In an acid medium, thorium oxalate precipitates, whereas uranium oxalate is soluble and the formation of oxalates is certainly one of the easiest and quickest ways of separating uranium and thorium from each other. Unfortunately, oxalic acid is a synthesis product which is very expensive.

It is also possible to take advantage of the fact that thorium pyrophosphate is insoluble. But on the one hand it carries along substantial amounts of uranium, and on the other hand its subsequent transformation for the utiliztion of thorium is difficult. Furthermore, sodium pyrophosphate is an expensive product.

Concerning the separation of uranium and thorium from each other in an alkaline medium, various reactions are also known.

It is for instance possible to take advantage of the fact that peruranate is slightly soluble whereas thorium peroxide is insoluble. A separation of this kind calls for very large volumes, and therefore an installation which occupies a lot of space and involves a high consumption of hyrogen peroxide (an expensive product) due to the low stability thereof in an alkaline medium in the presence of a powdery body.

Another method makes use of the properties of uranium and thorium carbonated complexes. Carbonated complexes are formed for the two elements as soon as the pH reaches 7 and they dissolve together in an excess of alkaline carbonate. Then, in the presence of ammonia, thorium partly decomposes and precipitates while driving along a very small amount of uranium. This reaction asks for a great number of stages in order to obtain a complete separation.

The object of the present invention is to provide a separation method which is free from the various drawbacks above stated concerning prior methods.

For this purpose, we add to an acid solution of salts of thorium and uranium at least as many gram-molecules of a soluble sulfate (this term being hereinafter explained) as there are gram-atoms of uranium and thorium in the solution, then we warm the solution thus obtained and finally we neutralize the whole to a pH ranging from 2.8 to 5.2 (preferably from 3 to 4), which precipitates thorium whereas uranium remains in solution.

The term "soluble" sulfate designates a sulfate which does not precipitate during the neutralization step, which causes thorium sulfate to precipitate. In particular, sodium sulfate is perfectly well adapted to constitute such a "soluble" sulfate, and it is very cheap. Ammonium sulfate and magnesium sulfate may also be used according to our invention.

In order to neutralize the solution after the addition of this soluble sulfate, we may use for instance ammonium carbonate, ammonia or soda. But it seems particularly advantageous to make use of sodium carbonate which is less expensive.

The precipitation of thorium sulfate takes place for a pH ranging from 2.8 to 5.2. A pH ranging from 3 to 4 however leads to a better separation of uranium and thorium and therefore to a more interesting industrial yield of the operation.

The method for separating uranium and thorium from each other according to our invention calls for a relatively small number of operations in order to obtain a given purity and requires apparatus of relatively small dimensions. Furthermore, the cost of this method is relatively low. This method is particularly advantageous for the industrial separation of uranium and thorium in the treatment of urano-thorianite for the separate purification of these two elements by means of solvents.

We will now describe two embodiments, given without limitative character, of the method of separating uranium and thorium in acid solution according to the invention.

Example I

We make use of a solution of urano-thorianite attacked by nitric acid in the proportion of 3 liters of nitric acid at 40% of $NO_3H$ for one kilogram of urano-thorianite. This attack is carried out at 80° C. and the solution that is obtained contains 32 grams of uranium and 172 grams of thorium per liter.

To one liter of this solution we add two liters of water (in order to reduce the concentration to about 10 grams of uranium per liter), then we add 250 grams of anhydrous $SO_4Na_2$ in order to precipitate thorium sulfate.

The solution is then warmed to about 35° C., then slowly neutralized (duration of this operation: ¼ of an hour) by means of a solution of sodium carbonate containing 200 grams of $CO_3Na_2$ per liter until there is obtained a pH ranging from 3.3 to 3.4, with a good stirring. It is found that 98.5% of the thorium are precipitated.

After waiting half an hour to enable the grains to increase, the solution is filtered. The filtrate is clear from the beginning and the filtration is extremely quick. This filtrate is washed with a 5% solution of $SO_4Na_2$ for instance. We obtain a cake of basic sulfate containing 1% of uranium with respect to thorium. (If the cake thus obtained is once more dissolved into nitric acid and if the preceding cycle is repeated, this proportion may be lowered to from 0.3 to 0.4%).

The cake of sulfate is subsequently stirred with 4 liters of water containing 200 grams of soda at 80° C., filtered and washed. We thus obtain thorium hydroxide containing less than 1% of uranium which may be transformed into any salt and in particular into a nitrate, possibly for purification by means of a solvent.

*Example II*

The ore used in this case contains 10 parts of thorium for one part of uranium. We obtain, after a single precipitation of basic thorium sulfate according to the invention, the following compositions for the precipitate and the solution:

Precipitate:
99.95% of thorium
0.05% of uranium (about 0.5% of the total uranium)

Solution:
10% of thorium (about 1% of the total thorium)
90 of uranium

The last portions of thorium as may remain in solution with uranium may be precipitated for instance by oxalic acid. This reagent is then used in amounts which represent about 10 times less than in the method where thorium is precipitated in the state of oxalate.

What we claim is:

1. A method of separating uranium and thorium from each other, which comprises treating a raw material containing uranium and thorium with nitric acid, adding to the acid solution thus obtained a sulfate of the group consisting of sodium sulfate, magnesium sulfate and ammonium sulfate, the number of gram-molecules of said sulfate thus added being at least equal to the sum of the numbers of gram-atoms of uranium and thorium present in said solution, warming the mixed solution thus formed, and neutralizing it to a pH ranging from 2.8 to 5.2 whereby thorium is precipitated in the form of basic thorium sulfate, whereas uranium remains in solution.

2. A method of separating uranium and thorium from each other, which comprises treating a raw material containing uranium and thorium with nitric acid, adding sodium sulfate to the acid thus obtained, the number of gram-molecules of said sulfate thus added being at least equal to the sum of the numbers of gram-atoms of uranium and thorium present in said solution, warming the mixed solution thus formed, and neutralizing it to a pH ranging from 2.8 to 5.2 whereby thorium is precipitated in the form of basic thorium sulfate, whereas uranium remains in solution.

3. A method of separating uranium and thorium from each other, which comprises treating a raw material containing uranium and thorium with nitric acid, adding ammonium sulfate to the acid thus obtained, the number of gram-molecules of said sulfate thus added being at least equal to the sum of the numbers of gram-atoms of uranium and thorium present in said solution, warming the mixed solution thus formed, and neutralizing it to a pH ranging from 2.8 to 5.2 whereby thorium is precipitated in the form of basic thorium sulfate, whereas uranium remains in solution.

4. A method of separating uranium and thorium from each other, which comprises treating a raw material containing uranium and thorium with nitric acid, adding magnesium sulfate to the acid thus obtained, the number of gram-molecules of said sulfate thus added being at least equal to the sum of the numbers of gram-atoms of uranium and thorium present in said solution, warming the mixed solution thus formed, and neutralizing it to a pH ranging from 2.8 to 5.2 whereby thorium is precipitated in the form of basic thorium sulfate, whereas uranium remains in solution.

5. A method of separating uranium and thorium from each other, which comprises treating a raw material containing uranium and thorium with nitric acid, adding to the acid solution thus obtained a sulfate of the group consisting of sodium sulfate, magnesium sulfate and ammonium sulfate, the number of gram-molecules of said sulfate thus added being at least equal to the sum of the numbers of gram-atoms of uranium and thorium present in said solution, warming the mixed solution thus formed, and neutralizing it to a pH ranging from 3 to 4 whereby thorium is precipitated in the form of basic thorium sulfate, whereas uranium remains in solution.

6. A method of separating uranium and thorium from each other, which comprises treating a raw material containing uranium and thorium with nitric acid, adding to the acid solution thus obtained a sulfate of the group consisting of sodium sulfate, magnesium sulfate and ammonium sulfate, the number of gram-molecules of said sulfate thus added being at least equal to the sum of the numbers of gram-atoms of uranium and thorium present in said solution, warming the mixed solution thus formed, and neutralizing it by means of sodium carbonate to a pH ranging from 2.8 to 5.2 whereby thorium is precipitated in the form of basic thorium sulfate, whereas uranium remains in solution.

7. A method according to claim 2 which further comprises treating the uranium containing solution by means of oxalic acid in order to precipitate the amount of thorium that may remain in this solution as thorium oxalate.

References Cited in the file of this patent
UNITED STATES PATENTS

| 1,232,334 | Kreidl | July 3, 1917 |
| 1,368,243 | Davis | Feb. 15, 1921 |